(12) United States Patent
Foote et al.

(10) Patent No.: US 10,951,827 B1
(45) Date of Patent: Mar. 16, 2021

(54) COMPACT DIGITAL NIGHT VISION GOGGLES

(71) Applicant: Rockwell Collins, Inc., Cedar Rapids, IA (US)

(72) Inventors: Bobby D. Foote, Marion, IA (US); Ty O'Brien, Carlsbad, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/009,777

(22) Filed: Jun. 15, 2018

(51) Int. Cl.
*H04N 5/232* (2006.01)
*H04N 5/33* (2006.01)
*G02B 25/00* (2006.01)

(52) U.S. Cl.
CPC ....... *H04N 5/23293* (2013.01); *G02B 25/001* (2013.01); *H04N 5/332* (2013.01)

(58) Field of Classification Search
None
See application file for complete search history.

(56) References Cited

U.S. PATENT DOCUMENTS

| 2010/0128355 A1* | 5/2010 | Janeczko | G02B 9/06 359/629 |
| 2013/0002872 A1* | 1/2013 | Fantone | H04N 5/33 348/148 |
| 2017/0139212 A1* | 5/2017 | Choi | G06F 3/013 |

OTHER PUBLICATIONS

Amitai, "P-27: A Two-Dimensional Aperture Expander for Ultra-Compact, High-Performance Head-Worn Displays," SID Symposium Digest of Technical Papers. vol. 36. No. 1. 2005, pp. 360-363. (Year: 2005).*

* cited by examiner

*Primary Examiner* — Christopher Braniff
(74) *Attorney, Agent, or Firm* — Suiter Swantz pc llo

(57) ABSTRACT

The DNVG includes a digital light sensor, a digital display, and an eyepiece. The digital light sensor is arranged to detect visible and near infrared light from an object and provide a digital signal based on the detected light. The digital display is arranged to provide a digital image of the object based on the digital signal provided by the digital light sensor. The eyepiece is configured to provide the digital image from the digital display to an eye of a user of the night vision goggles. The eyepiece includes a lens assembly and a reflector having a reflector surface, the lens assembly imaging light from the digital image via the reflective surface to the eye of the user. Alternatively, the eyepiece includes waveguide optics transporting imaging light from the digital image to the eye of the user.

10 Claims, 3 Drawing Sheets

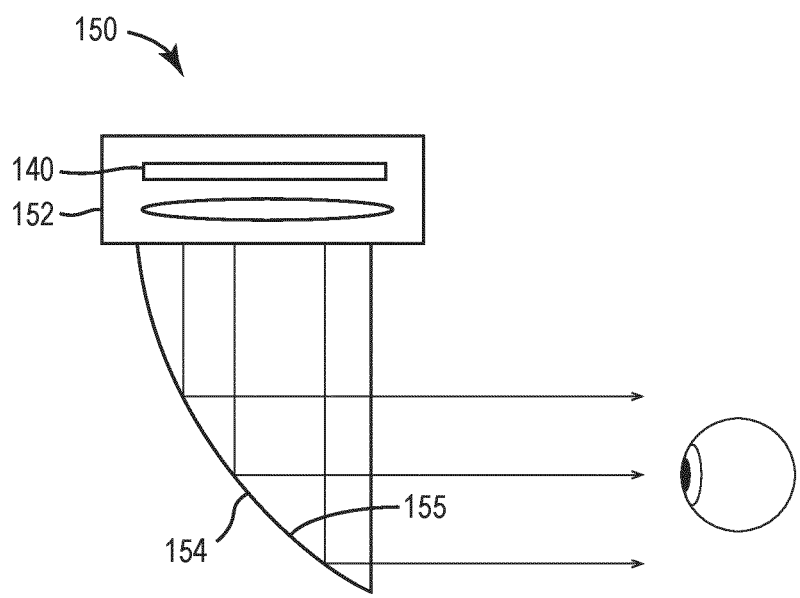
FIG. 4
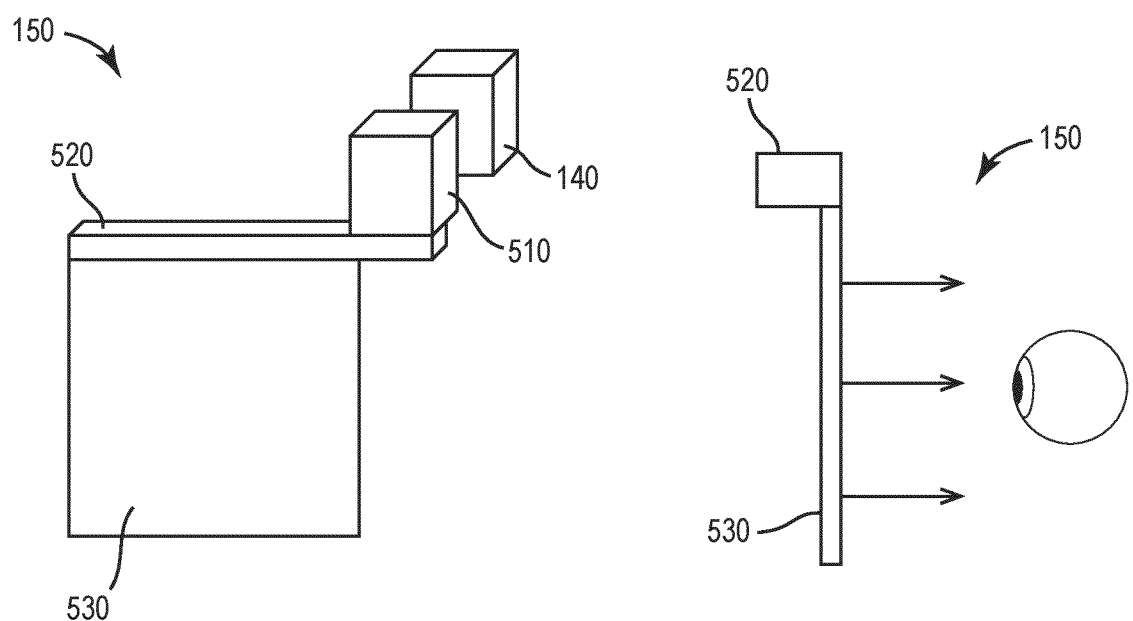
FIG. 5
FIG. 6

COMPACT DIGITAL NIGHT VISION GOGGLES

BACKGROUND

Digital night vision goggles (DNVG) can provide full color displays for a user such as a pilot of an airdraft. DNVG provide multi spectral capability, and may fuse detection of Long Wave Infrared (LWIR) radiation, Short Wave Infrared (SWIR) or color cameras with Near Infrared (NIR) sensors, for example.

In use DNVG are often mounted on the head gear of a user. Thus, the DNVG may provide a neck strain on the user due to the weight of the DNVG.

SUMMARY

In one aspect, embodiments of the inventive concepts disclosed herein are directed to DNVG. The DNVG includes a digital light sensor, a digital display, and an eyepiece. The digital light sensor is arranged to detect visible and near infrared light from an object and provide a digital signal based on the detected light. The digital display is arranged to provide a digital image of the object based on the digital signal provided by the digital light sensor. The eyepiece is configured to provide the digital image from the digital display to an eye of a user of the night vision goggles. The eyepiece includes a lens assembly and a reflector having a reflector surface, the lens assembly imaging light from the digital image via the reflective surface to the eye of the user.

In a further aspect, embodiments of the inventive concepts disclosed herein are directed to DNVG. The DNVG includes a digital light sensor, a digital display, and an eyepiece. The digital light sensor is arranged to detect visible and near infrared light from an object and provide a digital signal based on the detected light. The digital display is arranged to provide a digital image of the object based on the digital signal provided by the digital light sensor. The eyepiece is configured to provide the digital image from the digital display to an eye of a user of the night vision goggles. The eyepiece includes waveguide optics transporting imaging light from the digital image to the eye of the user.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 4 is a schematic illustrating an eyepiece along with the digital display according to some embodiments of the inventive concepts disclosed herein.

FIG. 5 is a schematic illustrating another eyepiece along with the digital display according to some embodiments of the inventive concepts disclosed herein.

FIG. 6 is a schematic according to the inventive concepts disclosed herein illustrating a side view of the waveguide display and the vertical beam expander of the eyepiece of FIG. 5.

DETAILED DESCRIPTION

Embodiments of the inventive concepts disclosed herein concern a DNVG with a smaller, more compact eyepiece. The design beneficially reduces the size and weight of the DNVG.

Moreover, embodiments of the inventive concepts disclosed herein concern a DNVG with a smaller, more compact eyepiece in the context of headgear mounted DNVG. The smaller weight can reduce the neck strain on a user of the DNVG.

While some of the drawings illustrate a single eyepiece of the DNVG for ease of illustration, in general the DNVG may have two eyepieces, one for each eye.

Figure 1:
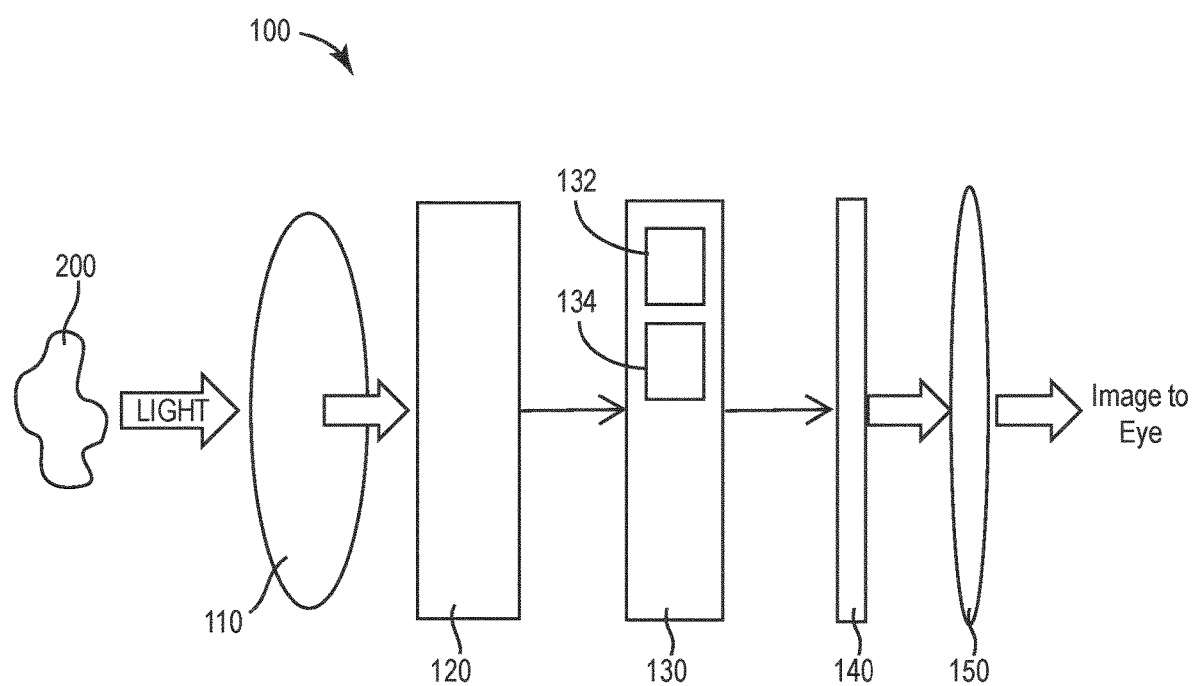
FIG. 1 is a schematic illustrating a DNVG according to inventive concepts disclosed herein.
Figure 2:
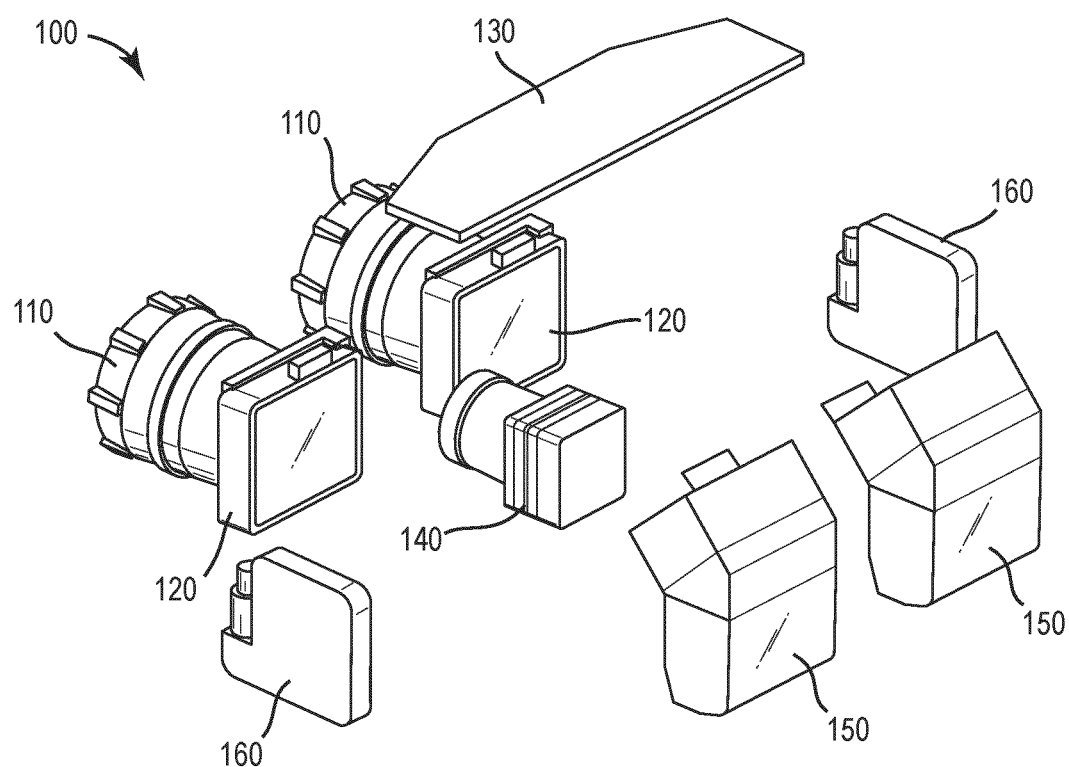
FIG. 2 is an exploded view of the DNVG according to inventive concepts disclosed herein.
Figure 3:
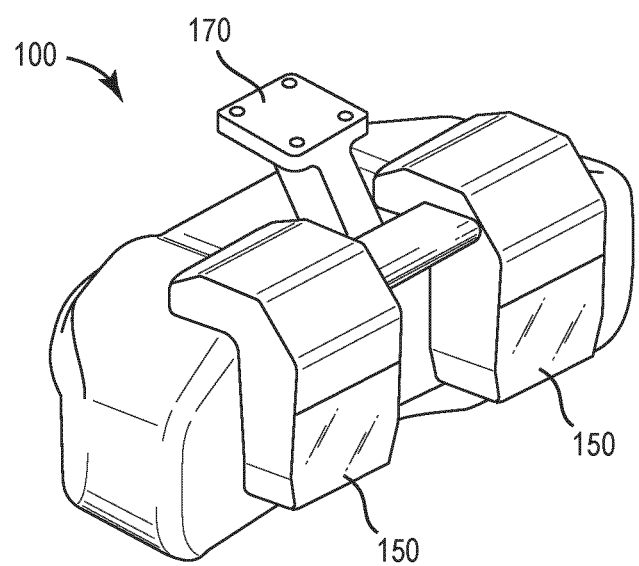
FIG. 3 is a perspective view of the DNVG according to inventive concepts disclosed herein.

FIGS. 1-3 illustrate a DNVG 100 according to inventive concepts disclosed herein. FIG. 1 is schematic of the DNVG 100 according to inventive concepts disclosed herein. FIG. 2 is an exploded view of the DNVG 100 according to inventive concepts disclosed herein. FIG. 3 is a perspective view of the DNVG 100 according to inventive concepts disclosed herein.

The DNVG 100 may include objective optics 110, a digital light sensor 120, processing electronics 130, a digital display 140, an eyepiece 150 and a power supply 160. If the DNVG 100 is to be mounted to headgear, such as a helmet for example, the DNVG 100 may further include a mount 170 to facilitate mounting.

The objective optics 110 are arranged to receive light from an object 200 and to image the received light onto the digital light sensor 120. The objective optics 110 may include an objective lens. The inventive concepts disclosed herein are not limited to the objective optics 110 being an objective lens and may include reflective as well as reflective elements.

The digital light sensor 120 is arranged to receive the light from the objective optics 110 imaged onto the digital light sensor 120. The digital light sensor 120 may be sensitive to visible light as well as near infrared (NIR) light from the object 200. The material of the digital light sensor 120 may be a semiconductor material, for example, or may be other materials sensitive to visible and NIR light. The digital light sensor 120 is arranged to detect visible and NIR light from the object 200 and to provide a digital signal based on the detected light.

The digital light sensor 120 may be arranged as a two-dimensional array of pixels. Each pixel may include a separate light sensor or sensors configured to detect light in the visible and NIR. Thus the digital light sensor 120 may be arranged to detect a two- dimensional image of the object 200.

The processing electronics 130 are configured to receive the digital light signal from the digital light sensor 120, process the digital light signal to provide a processed digital signal, and the cause the digital display 140 to provide a digital image based on the processed digital signal.

The processing electronics 130 may include a processor 132 and a memory 134. The processor 132 is arranged to perform functions, such as digital processing of the digital light signal received from the digital light sensor 120. The processor 132 may perform functions, for example, based on software stored in the memory 134. The processing electronics 130 may include a digital processing card, for example.

The processing electronics 130 performs digital processing on the digital light signal received from the digital light sensor 120. The digital processing enhances the digital light signal to provide a processed digital signal.

The digital display 140 is arranged to provide a digital image of the object 200 based on the digital signal provided by the digital light sensor 120. In particular, the digital signal provided by the digital light sensor 120 is received by the processing electronics 130, and then enhanced to provide a processed digital signal, which is provided to the digital display 140. The digital display 140 generates a digital image of the object based on the processed digital signal. The digital image generated by the digital display 140 may be a two-dimensional image according to inventive concepts disclosed herein.

The digital display 140 may be a monochrome display or a full color display, for example. The digital display 140 may be a liquid crystal display, such as an active matrix liquid crystal display (AMLCD), for example. Alternatively, the digital display 140 may be a an organic light emitting diode (OLED) display, or a liquid crystal on silicon (LCOS) display according to inventive concepts disclosed herein.

The power supply 160 provides power for components of the DNVG 100. For example, the power supply 160 may provide power for the digital light sensor 120, the processing electronics 130 and the digital display 140.

The DNVG 100 may be a hand held DNVG or a head gear worn DNVG, for example. In the case the DNVG 100 is to be mounted to headgear, such as a helmet for example, the DNVG 100 may further include a mount 170 to facilitate mounting.

The DNVG 100 further includes an eyepiece 150 according to the inventive concepts disclosed herein. The eyepiece 150 is configured to provide the digital image generated by the digital display 140 to an eye of a user of the DNVG 100. The eyepiece 150 has a relatively low profile and is relatively small in size, and thus reduces the size and weight of the DNVG overall.

FIG. 4 is a schematic illustrating the eyepiece 150 along with the digital display 140 according to some embodiments of the inventive concepts disclosed herein. In FIG. 4, the eyepiece 150 includes a lens assembly 152 and reflector 154 having a reflective surface 155. The lens assembly 152 images light from the digital image generated by the digital display 140 via the reflective surface 155 to an eye of the user.

According to some embodiments of the inventive concepts disclosed herein, the lens assembly 152 and reflector 154 are arranged so that the lens assembly 152 directs light from the digital display 140 in one direction substantially perpendicular to the image surface of the digital display 140. The reflective surface 155 of the reflector 154 redirects the light from the lens assembly 152 in another direction substantially perpendicular to the one direction. Thus, the size and profile of the DNVG 100 can be reduced.

FIG. 5 is a schematic illustrating the eyepiece 150 along with the digital display 140 according to some embodiments of the inventive concepts disclosed herein. In FIG. 5 the eyepiece 150 includes waveguide optics to transport imaging light from the digital image generated by the digital display 140 to the eye of the user.

The waveguide optics may include according to some embodiments of the inventive concepts disclosed herein beam expanders and a waveguide display. For example, the waveguide optics may include a horizontal beam expander 510 (first beam expander), a vertical beam expander 520 (second beam expander), and a waveguide display 530.

In some embodiments according to the inventive concepts disclosed herein where the eyepiece 150 includes waveguide optics, the digital display 140 may be a micro-display assembly. The horizontal beam expander 510 is arranged to expand light from the micro-display assembly in a horizontal direction (first direction). The vertical beam expander 520 is arranged to expand light from the horizontal beam expander 510 in a vertical direction (second direction) perpendicular to the horizontal direction. The waveguide display 530 is arranged to receive light from the vertical beam expander 520 and to generate an image based on the light from the vertical beam expander 520.

FIG. 6 is a schematic according to the inventive concepts disclosed herein illustrating a side view of the waveguide display 530 and the vertical beam expander 520 of the eyepiece 150 of FIG. 5. As can be seen in FIG. 6, the waveguide display 530 provides an image to an eye of the user.

Embodiments of the inventive concepts disclosed herein concern a DNVG with a smaller, more compact eyepiece. The design beneficially reduces the size and weight of the DNVG.

Moreover, embodiments of the inventive concepts disclosed herein concern a DNVG with a smaller, more compact eyepiece in the context of headgear mounted DNVG. The smaller weight can reduce the neck strain on a user of the DNVG.

The embodiments of the inventive concepts disclosed herein have been described in detail with particular reference to preferred embodiments thereof, but it will be understood by those skilled in the art that variations and modifications can be effected within the spirit and scope of the inventive concepts.

What is claimed is:

1. Digital night vision goggles (DNVG) comprising:
  a digital light sensor arranged to detect visible and near infrared light from an object and provide a digital signal based on the detected light;
  a digital display arranged to provide a digital image of the object based on the digital signal provided by the digital light sensor; and
  an eyepiece configured to provide the digital image from the digital display to an eye of a user of the night vision goggles,
  wherein the eyepiece includes a lens assembly and a reflector having a curved reflective surface, the lens assembly directly receiving light of the digital image from the digital display and imaging the light from the digital image via the curved reflective surface to the eye of the user;
  wherein the curved reflective surface of the reflector is configured to directly receive light in a first direction from a lens of the lens assembly and reflect the light in a second direction substantially perpendicular to the first direction to the eye of the user.

2. The DNVG according to claim 1, wherein the digital display is one of a liquid crystal display, an organic light emitting diode display or a liquid crystal on silicon display.

3. The DNVG according to claim 1, further comprising objective optics arranged to receive light from the object and to image light onto the digital light sensor.

4. The DNVG according to claim 3, wherein the objective optics includes an objective lens.

5. The DNVG according to claim 1, further comprising processing electronics configured to receive the digital signal from the digital light sensor, process the digital signal to provide a processed digital signal, and cause the digital display to provide the digital image based on the processed digital signal.

6. The DNVG according to claim 1, wherein the DNVG are one of hand held DNVG or head gear worn DNVG.

7. The DNVG according to claim 1, wherein the DNVG are head gear worn DNVG, and the DNVG further include a mount arranged for mounting the DNVG to the head gear.

8. The DNVG according to claim 1, wherein the digital display is a full color display.

9. The DNVG according to claim 1, wherein the curved reflective surface is a concave surface.

10. The DNVG according to claim 1, wherein the second direction is substantially perpendicular to the curved reflective surface.

\* \* \* \* \*